(12) United States Patent
Cichon et al.

(10) Patent No.: US 10,968,877 B2
(45) Date of Patent: Apr. 6, 2021

(54) ELECTROMAGNETICALLY ACTUATABLE SUCTION VALVE AND METHOD FOR PRODUCING AN ELECTROMAGNETICALLY ACTUATABLE SUCTION VALVE

(71) Applicant: Robert Bosch GmbH, Stuttgart (DE)

(72) Inventors: Gabriel Cichon, Ludwigsburg (DE);
Stefan Kolb, Gaertringen (DE); Steffen Holm, Stuttgart (DE); Tobias Landenberger, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 16/326,761

(22) PCT Filed: Aug. 2, 2017

(86) PCT No.: PCT/EP2017/069507
§ 371 (c)(1),
(2) Date: Feb. 20, 2019

(87) PCT Pub. No.: WO2018/036765
PCT Pub. Date: Mar. 1, 2018

(65) Prior Publication Data
US 2019/0186449 A1 Jun. 20, 2019

(30) Foreign Application Priority Data

Aug. 23, 2016 (DE) .................... 10 2016 215 745.0

(51) Int. Cl.
*F02M 59/36* (2006.01)
*F02M 59/46* (2006.01)
(Continued)

(52) U.S. Cl.
CPC ........ *F02M 59/368* (2013.01); *F02M 59/445* (2013.01); *F02M 59/466* (2013.01);
(Continued)

(58) Field of Classification Search
CPC ............... F02M 59/368; F02M 59/466; F02M 2200/06; F16K 31/0655; F16K 31/0675;
(Continued)

(56) References Cited

U.S. PATENT DOCUMENTS 8,246,004 B2 * 8/2012 Kratzer ................... B60T 8/363
251/129.15
8,322,684 B2 * 12/2012 Otsuka ..................... F16K 1/427
251/129.15
(Continued)

FOREIGN PATENT DOCUMENTS

CN 1507537 A 6/2004
CN 102725508 A 10/2012
(Continued)

OTHER PUBLICATIONS

Machine translation DE 102014200339.*
International Search Report for Application No. PCT/EP2017/069507 dated Oct. 26, 2017 (English Translation, 3 pages).
(Continued)

*Primary Examiner* — Kevin F Murphy
(74) *Attorney, Agent, or Firm* — Michael Best & Friedrich LLP

(57) ABSTRACT

The invention relates to an electromagnetically controllable suction valve (1) for a high-pressure fuel pump (2), comprising a magnet assembly (3) and a hydraulic module (4), the hydraulic module (4) engaging at least in sections in an annular magnet coil (5) of the magnet assembly (3). According to the invention, a heat-conducting material (6) and/or a heat-conducting body (7) is/are arranged between the magnet coil (5) and the hydraulic module (4). The invention further relates to a method for producing an electromagnetically actuatable suction valve (1).

11 Claims, 4 Drawing Sheets

(51) Int. Cl.
  *F02M 59/44* (2006.01)
  *F02M 59/48* (2006.01)
  *F16K 31/06* (2006.01)
  *F16K 49/00* (2006.01)
  *F02M 63/00* (2006.01)

(52) U.S. Cl.
  CPC ......... *F02M 59/48* (2013.01); *F16K 31/0655* (2013.01); *F16K 49/005* (2013.01); *F02M 63/0022* (2013.01); *F02M 2200/06* (2013.01); *F02M 2200/8046* (2013.01); *F02M 2200/8061* (2013.01)

(58) Field of Classification Search
  CPC ... F16K 49/00; F16K 49/005; Y10T 137/7036
  See application file for complete search history.

(56) References Cited

U.S. PATENT DOCUMENTS

| | | | |
|---|---|---|---|
| 9,163,746 B2 * | 10/2015 | Voss | ............ F16K 31/0658 |
| 2010/0001094 A1 | 1/2010 | Venkataraghavan et al. | |
| 2016/0009266 A1 * | 1/2016 | Katayama | ............ F16K 27/029 |
| | | | 251/129.15 |

FOREIGN PATENT DOCUMENTS

| | | | | |
|---|---|---|---|---|
| CN | 105814304 A | 7/2016 | | |
| DE | 102011002570 | 7/2012 | | |
| DE | 102014200339 A1 * | 7/2015 | ........... | F02M 59/367 |
| DE | 102014220757 | 4/2016 | | |
| WO | 0015988 | 3/2000 | | |
| WO | 2005116442 | 12/2005 | | |
| WO | 2015082118 | 6/2015 | | |

* cited by examiner

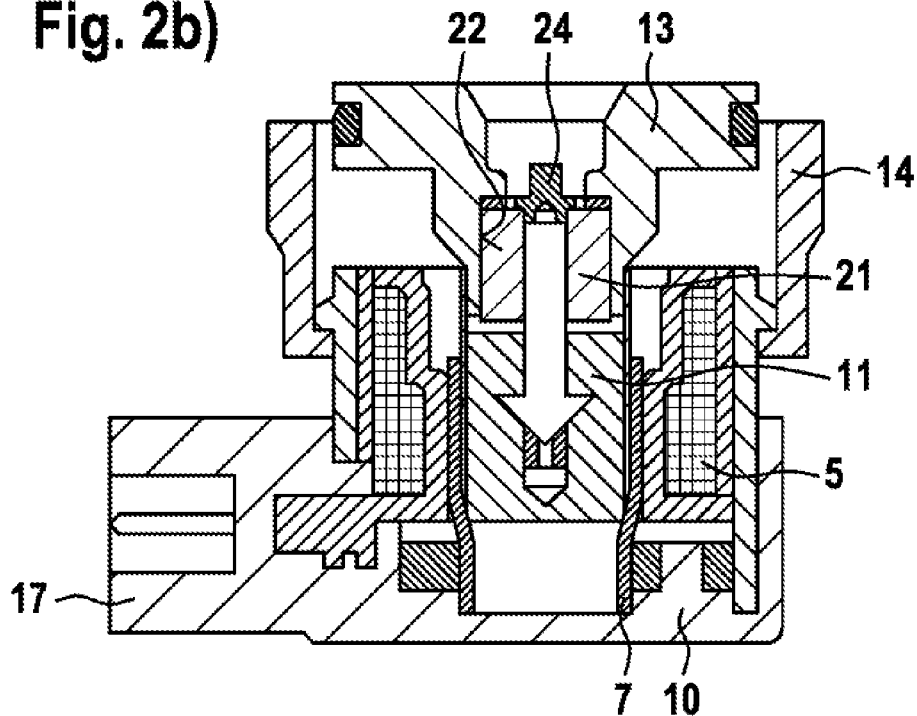
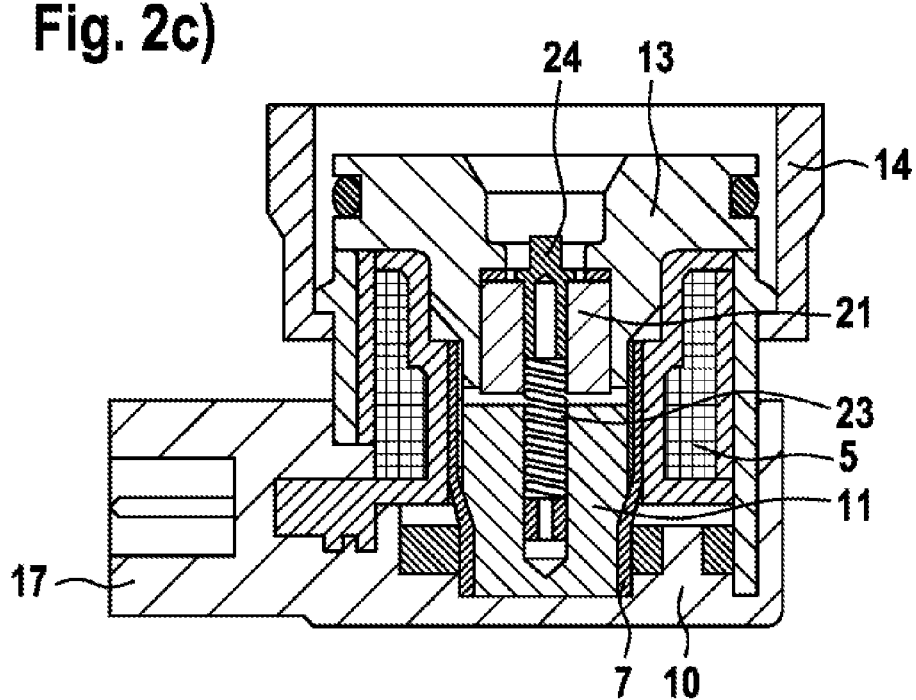

ELECTROMAGNETICALLY ACTUATABLE SUCTION VALVE AND METHOD FOR PRODUCING AN ELECTROMAGNETICALLY ACTUATABLE SUCTION VALVE

BACKGROUND OF THE INVENTION

The invention relates to an electromagnetically actuatable suction valve for a high-pressure fuel pump. The invention furthermore relates to a method for producing an electromagnetically actuatable suction valve.

By way of example, DE 10 2014 220 757 A1 discloses an electromagnetically actuatable suction valve for filling a high-pressure element chamber of a high-pressure pump with fuel. For this purpose, the suction valve is integrated into a housing part of the high-pressure pump, thus ensuring that a valve piston of the suction valve, which can execute a stroke motion, is guided by means of the housing part. To actuate the valve piston, the suction valve has a magnet assembly having an annular magnet coil. The magnet coil surrounds a pole core, which is connected via a sleeve to a valve body, in which an armature that can be coupled to the valve piston is accommodated for a stroke motion. A spring arranged between the armature and the pole core preloads the armature in the direction of the valve piston, ensuring that this is held in an open position by the spring force of the spring when the magnet coil is not energized. If the magnet coil is energized, the armature moves in the direction of the pole core against the spring force of the spring in order to close a working air gap formed between the pole core and the armature. During this process, the armature is released from the valve piston, and a valve spring supported on the valve piston can close the suction valve. For opening, the energization of the magnet coil is ended, with the result that the spring arranged between the pole core and the armature raises the valve piston out of its sealing seat with the aid of the armature and opens the suction valve.

During energization, the magnet coil heats up. In this context, the temperatures can rise so sharply that a plastic encapsulation surrounding the magnet assembly, at least in some section or sections, softens or even breaks. This can lead to contacting errors in the region of a plug formed by the plastic encapsulation, and therefore the operation of the suction valve is no longer guaranteed.

SUMMARY OF THE INVENTION

Proceeding from the abovementioned prior art, it is the underlying object of the invention to increase the robustness, in particular temperature-stability, of an electromagnetically actuatable suction valve, thus ensuring that the abovementioned disadvantages do not occur.

To achieve the object, the electromagnetically actuatable suction valve according to the invention is proposed. A method for producing an electromagnetically actuatable suction valve is furthermore specified.

The electromagnetically actuatable suction valve proposed for a high-pressure fuel pump comprises a magnet assembly and a hydraulic module. In this case, at least some section or sections of the hydraulic module engages or engage in an annular magnet coil of the magnet assembly. According to the invention, a heat-conducting material and/or a heat-conducting body is/are arranged between the magnet coil of the magnet assembly and the hydraulic module. During energization of the magnet coil, the heat-conducting material and/or the heat-conducting body improves or improve heat dissipation via the hydraulic module, wherein the cooling function of the hydraulic module, through which fuel flows, is used. This means that at least some of the heat is dissipated inward, thus ensuring the operation of the suction valve, even when operating at high ambient temperatures.

Accordingly, the object of the heat-conducting material or heat-conducting body is to optimize heat transfer between the magnet assembly and the hydraulic module. This is particularly the case when the thermal conductivity $\lambda$ of the heat-conducting material or heat-conducting body is significantly above that of air (about 0.026 W/m*K). The thermal conductivity $\lambda$ of the heat-conducting material or heat-conducting body should therefore be at least 5 W/m*K.

The arrangement of the heat-conducting material and/or of the heat-conducting body is preferably accomplished by using an already existing air gap, thus ensuring that the measures for improving heat dissipation do not have any effect on the installation space requirement of the suction valve. In this way, the concept can be implemented in a manner which is neutral in terms of installation space and without any major additional design complexity.

The optimization of the heat dissipation via the hydraulic module situated on the inside brings with it an increase in the temperature stability of the suction valve and hence the robustness thereof. As a consequence, the service life of the suction valve is also increased. Furthermore, an expansion of the range of application is possible since higher currents can be used by virtue of the improved temperature stability.

The heat-conducting material and/or the heat-conducting body is/are preferably arranged in an annular gap between the magnet coil and the hydraulic module. Since the coil wire of a magnet coil is generally wound onto a bobbin, the annular gap is preferably delimited radially on the outside by the bobbin of the magnet coil. However, provision can also be made for the magnet coil not to have a bobbin and for the annular gap to be delimited by the winding of the magnet coil itself.

The annular gap between the magnet coil and the hydraulic module is generally filled with air. However, since air is a relatively poor heat conductor, heat dissipation toward the inside can be significantly improved by means of the heat-conducting material arranged in the annular gap and/or the heat-conducting body arranged in the annular gap.

As a further preference, the heat-conducting material is a heat transfer compound. The heat transfer compound allows arrangement of the heat-conducting material in a manner which substantially fills the gap, thus ensuring that heat transfer is improved at the respective interfaces. Moreover, the heat transfer compound can be used to achieve sealing between the magnet assembly and the hydraulic module, leading to a further increase in the robustness of the suction valve.

The minimization of the air volume between the magnet coil and the hydraulic module by means of the heat transfer compound furthermore has the advantage that less moisture is drawn into the interspace during cooling after energization of the magnet coil. The advantage takes effect even if the heat transfer compound itself loses volume.

If a heat-conducting body is provided between the magnet coil and the hydraulic module, this can have substantially the form of a sleeve. The sleeve shape makes it easier to arrange the heat-conducting body between the magnet coil and the hydraulic module. In particular, it can be used to fill an annular gap between the magnet coil and the hydraulic module. The dimensions of the heat-conducting body are therefore preferably matched to the dimensions of the annular gap.

As an alternative or in addition, it is proposed that the heat-conducting body is elastically deformable, enabling production- and/or assembly-related tolerances to be compensated by means of an elastic deformation of the heat-conducting body. This ensures that the heat-conducting body largely fills the annular gap between the magnet coil and the hydraulic module, ensuring that the advantages in respect of heat transfer and sealing which were mentioned above in connection with the heat transfer compound are also obtained here.

Moreover, a heat-conducting body can be used in combination with a heat-conducting material, in particular a heat transfer compound, wherein the heat-conducting material serves primarily to fill remaining gaps and cavities.

As a development of the invention, it is proposed that the heat-conducting material and/or the heat-conducting body at least partially fill or fills an axial gap between the magnet assembly and the hydraulic module. This is preferably an axial gap which is formed between a plastic encapsulation of the magnet assembly, said encapsulation surrounding the magnet coil, at least in some section or sections, and the hydraulic module. The arrangement of the heat-conducting material and/or of the heat-conducting body in the axial gap preferably uses an already existing air gap, thus ensuring that the measures for improving heat dissipation do not have an effect on the installation-space requirement of the suction valve. In this way, the air volume in the suction valve, which does not make any significant contribution to heat dissipation and moreover tends to attract moisture, is furthermore reduced.

According to a preferred embodiment of the invention, the hydraulic module comprises a pole core, which engages in the magnet coil and on which the heat-conducting material and/or the heat-conducting body rests or rest directly. The preferably full-surface contact between the heat-conducting material and/or the heat-conducting body and the pole core ensures high heat transfer.

As a further preference, the pole core is connected to a valve body via a welding sleeve, and the heat-conducting material and/or the heat-conducting body extends or extend beyond the welding sleeve, at least in some section or sections. The additional sealing function of the heat-conducting material or heat-conducting body protects the welding sleeve from moisture. This reduces the risk of corrosion to the welding seams that serve to connect the welding sleeve to the pole core and/or the valve body.

In the method that is furthermore proposed for producing an electromagnetically actuatable suction valve, at least some section or sections of a hydraulic module is/are inserted into an annular magnet coil of a magnet assembly. According to the invention, as the hydraulic module is inserted, a previously introduced heat-conducting material is displaced into an annular gap between the magnet coil and the hydraulic module. The heat-conducting material thus reduces the air volume between the magnet assembly and the hydraulic module, with the result that, on the one hand, heat dissipation toward the inside via the hydraulic module and, on the other hand, the sealing between the magnet assembly and the hydraulic module are improved. In particular, the heat-conducting material can be a heat transfer compound.

As an alternative or in addition, as the hydraulic module is inserted, a heat-conducting body previously inserted into the magnet coil is elastically deformed. In this way too, the air volume between the magnet assembly and the hydraulic module is reduced, resulting essentially in the same advantages. This applies especially if a sleeve-shaped and/or elastically deformable heat-conducting body is used.

By means of the method, it is possible, in particular, to produce the above-described electromagnetically actuatable suction valve according to the invention.

As a measure representing a further development, it is proposed that at least some section or sections of the hydraulic module is/are pressed into the magnet assembly, in particular into the magnet coil. By means of the press fit, the hydraulic module is held captive in the magnet assembly during the fixing of the suction valve on a high-pressure fuel pump.

BRIEF DESCRIPTION OF THE DRAWINGS

Preferred embodiments of the invention are explained in greater detail below with reference to the attached drawings, in which.

DETAILED DESCRIPTION OF THE DRAWINGS

Figure 1A:
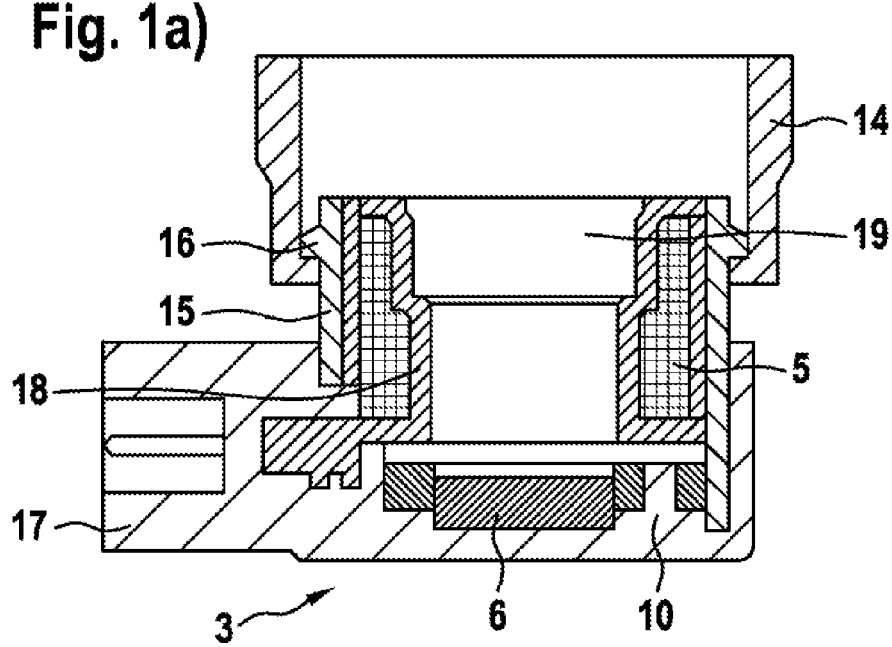
FIGS. 1a) to 1c) each show a schematic longitudinal section through a suction valve according to the invention preassembled to differing extents, according to a first preferred embodiment, FIGS. 2a) to 2c) each show a schematic longitudinal section through a suction valve according to the invention preassembled to differing extents, according to a second preferred embodiment.
Figure 1B:
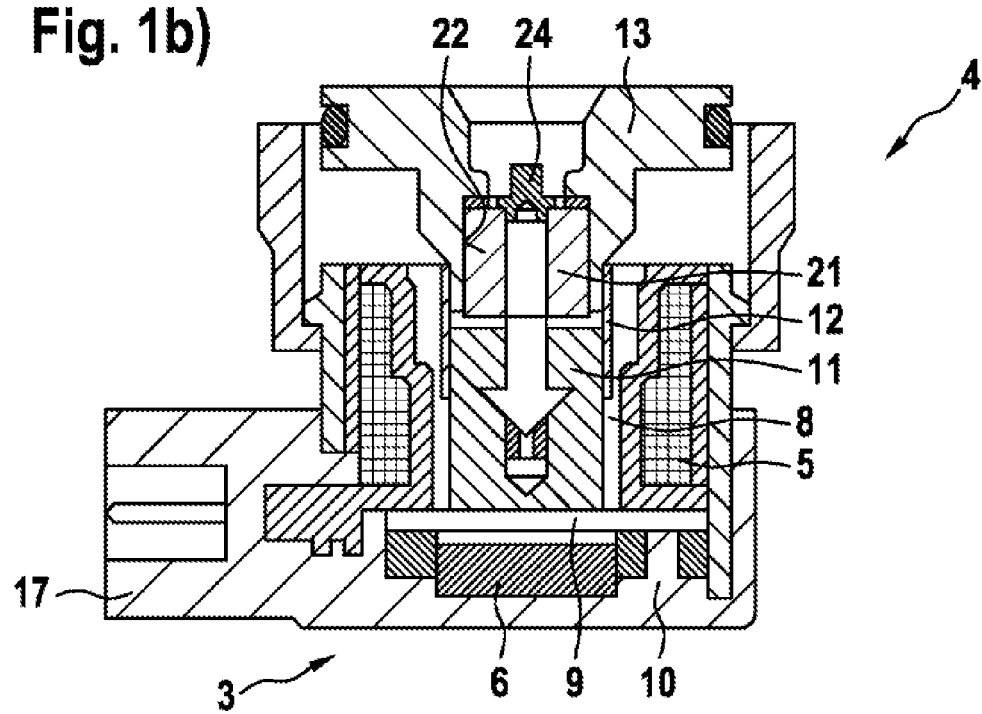
Figure 1C:
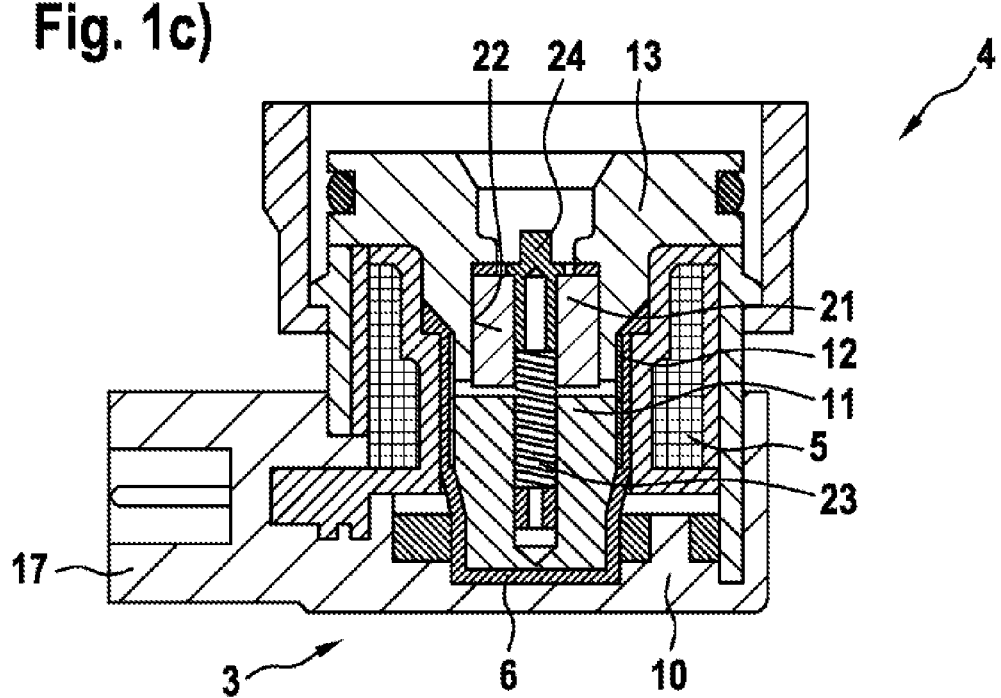

A first preferred embodiment of an electromagnetically actuatable suction valve 1 according to the invention is illustrated in FIG. 1, wherein the sequence of FIGS. 1a) to 1c) illustrates the individual assembly steps.

During assembly, two already preassembled units are connected to one another. These are a magnet assembly 3 as a first preassembled unit and a hydraulic module 4 as a further preassembled unit. Only the magnet assembly 3 can be seen in FIG. 1a).

The magnet assembly 3 illustrated in FIG. 1a) comprises an annular magnet coil 5, a magnet sleeve 15 surrounding the magnet coil 5, and a plastic encapsulation 10, which surrounds the magnet coil 5 and the magnet sleeve 15 at the end. The plastic encapsulation 10 simultaneously forms a plug 17, which is used to connect the magnet coil 5 to a power supply. At its exposed end, the magnet sleeve 15 has a collar 16, on which a clamping nut 14 for connecting the suction valve 1 to a high-pressure fuel pump 2 is supported or can be supported.

The magnet assembly 3 is oriented in such a way that the cavity 19 delimited by the annular magnet coil 5 or by the bobbin 18 of the magnet coil 5 opens upward. It is also possible to envisage no bobbin 18 being present and the cavity 19 being delimited by the magnet coil 5 itself. In a bottom region of the cavity 19, a heat-conducting material 6 in the form of a heat transfer compound filling part of the cavity 19 is introduced.

When, as illustrated in FIGS. 1b) and 1c), the hydraulic module 4 is then inserted into the magnet assembly 3, some of the heat-conducting material 6 is displaced into an annular gap 8 between the magnet coil 5 and, where present, the bobbin 18 and the hydraulic module 4. The displacement is brought about by means of a pole core 11 of the hydraulic module 4, which is connected to a valve body 13 via a welding sleeve 12. During this process, the heat-conducting material 6 penetrates so far into the annular gap 8 that the welding sleeve 12 is completely covered by the heat-conducting material 6. The welding sleeve 12 is thus optimally protected from corrosion. The heat-conducting material 6 has a gap-filling effect, and therefore the air volume originally present in the magnet assembly 3 is almost completely displaced. This is because both the annular gap 8 and a remaining axial gap 9 between the pole core 11 and the plastic encapsulation 10 are filled with the heat-conducting material 6. In this way, heat dissipation toward the inside via the hydraulic module 4 is optimized. At the same time, a seal is created between the magnet assembly 3 and the hydraulic module 4.

The hydraulic module 4 furthermore comprises an armature 21, which is guided in a central recess 22 of the valve body 13 in a manner which allows it to perform a stroke motion. Arranged between the armature 21 and the pole core 11 is a spring 23, which is used to axially preload the armature 21 in the direction of a valve plunger 20 (see FIG. 3). To make contact with the valve plunger 20, a contact pin 24 is pressed into the armature 21.

Figure 2A:
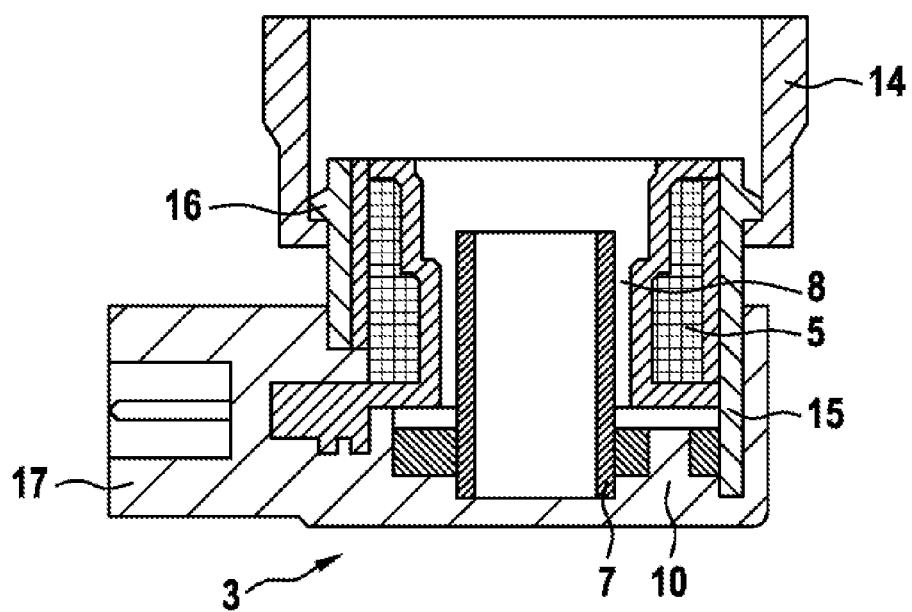

Another preferred embodiment of an electromagnetically actuatable suction valve 1 according to the invention is illustrated in FIG. 2, wherein the sequence of FIGS. 2a) to 2c) once again illustrates the individual assembly steps.

The magnet assembly 3 in FIG. 2a) has substantially the same construction as that in FIG. 1a). Instead of the heat-conducting material 6, however, a sleeve-shaped heat-conducting body 7 is inserted into the cavity 19, the selected inside diameter thereof being slightly smaller than the outside diameter of the pole core 11 of the hydraulic module 4. However, the material of the heat-conducting body 7 is elastically deformable under the action of force.

If, as illustrated in FIGS. 2b) and 2c), the hydraulic module 4 is then inserted with the pole core 11 first into the cavity 19, the heat-conducting body 7 is deformed and, in the process, comes to rest snugly against the bobbin 18 of the magnet coil 5 or against the magnet coil 5 itself if there is no bobbin 18. Thus, the heat-conducting body 7 almost completely fills the annular gap 8 between the magnet coil 5 and the hydraulic module 4. The height of the heat-conducting body 7 is preferably dimensioned in such a way that, when the suction valve 1 is fully assembled, it covers the pole core 11, including the welding sleeve 12.

Figure 3:
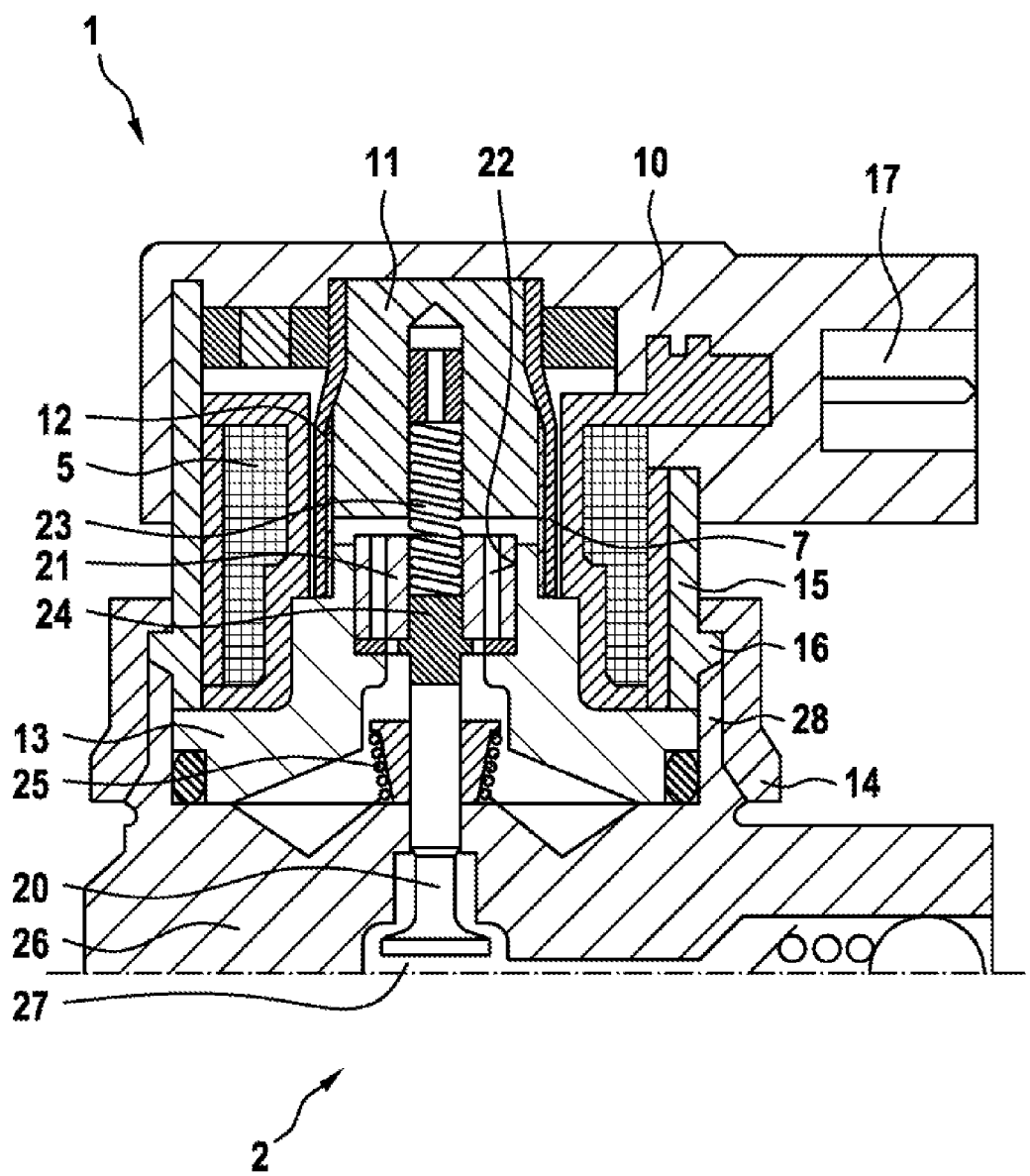
FIG. 3 shows a schematic longitudinal section through a fully assembled suction valve according to the invention, which is integrated into a high-pressure fuel pump.

In FIG. 3, the suction valve 1 of FIG. 2 is shown fully assembled. The suction valve 1 is integrated into a pump cylinder head 26 of a high-pressure fuel pump 2 in such a way that the valve plunger 20 of the suction valve 1 opens directly into a high-pressure element chamber 27 of the high-pressure fuel pump 2. The suction valve 1 is fixed on the pump cylinder head 26 by means of the clamping nut 14, which for this purpose is screwed onto a collar section 28 of the pump cylinder head 26.

When the magnet coil 5 is not energized, the spring 23 supported on the armature 21 holds the valve plunger 20 open against the spring force of another spring 25, indirectly via the armature 21 and the contact pin 24. If the magnet coil 5 is then energized, a magnetic field builds up, the magnetic force of which moves the armature 21 in the direction of the pole core 11. In the process, the armature 21 or contact pin 24 is released from the valve plunger 20, and the spring 25 can close the suction valve 1. If subsequently the energization of the magnet coil 5 is turned off, the spring force of the spring 23 once again exerts an opening effect.

What is claimed is:

1. An electromagnetically actuatable suction valve (1) for a high-pressure fuel pump (2), the valve (1) comprising a magnet assembly (3) and a hydraulic module (4), wherein at least some section or sections of the hydraulic module (4) engages or engage in an annular magnet coil (5) of the magnet assembly (3), characterized in that a heat-conducting material (6) or a heat-conducting body (7) is arranged between the magnet coil (5) and the hydraulic module (4), wherein the hydraulic module (4) comprises a pole core (11), which engages in the magnet coil (5) and on which the heat-conducting material (6) or the heat-conducting body (7) rests directly, and wherein the pole core (11) is connected to a valve body (13) via a welding sleeve (12), and the heat-conducting material (6) or the heat-conducting body (7) extends beyond the welding sleeve (12) and has a sealing function for the welding sleeve.

2. The suction valve as claimed in claim 1, characterized in that the heat-conducting material (6) or the heat-conducting body (7) is arranged in an annular gap (8) between the magnet coil (5) and the hydraulic module (4).

3. The suction valve as claimed in claim 1, characterized in that the heat-conducting material (6) is a heat transfer compound.

4. The suction valve as claimed in claim 1, characterized in that the heat-conducting body (7) has substantially the shape of a sleeve and/or is elastically deformable.

5. The suction valve as claimed in claim 1, characterized in that the heat-conducting material (6) or the heat-conducting body (7) at least partially fills or fill an axial gap (9) between the magnet assembly (3) and the hydraulic module (4).

6. The suction valve as claimed in claim 1, characterized in that the heat-conducting material (6) or the heat-conducting body (7) at least partially fills an axial gap (9) between a plastic encapsulation (10) of the magnet assembly (3), said encapsulation surrounding the magnet coil (5), at least in some section or sections.

7. An electromagnetically actuatable suction valve (1) for a high-pressure fuel pump (2), the valve (1) comprising a magnet assembly (3) and a hydraulic module (4), wherein at least some section or sections of the hydraulic module (4) engages or engage in an annular magnet coil (5) of the magnet assembly (3), characterized in that a heat-conducting material (6) is arranged between the magnet coil (5) and the hydraulic module (4), wherein the hydraulic module (4) comprises a pole core (11), which engages in the magnet coil (5) and on which the heat-conducting material (6) rests directly, and wherein the pole core (11) is connected to a valve body (13) via a welding sleeve (12), and the heat-conducting material (6) extends beyond the welding sleeve (12) and has a sealing function for the welding sleeve.

8. The suction valve as claimed in claim 7, characterized in that the heat-conducting material (6) is arranged in an annular gap (8) between the magnet coil (5) and the hydraulic module (4).

9. The suction valve as claimed in claim 7, characterized in that the heat-conducting material (6) is a heat transfer compound.

10. The suction valve as claimed in claim 7, characterized in that the heat-conducting material (6) at least partially fills an axial gap (9) between the magnet assembly (3) and the hydraulic module (4).

11. The suction valve as claimed in claim 7, characterized in that the heat-conducting material (6) at least partially fills an axial gap (9) between a plastic encapsulation (10) of the magnet assembly (3), said encapsulation surrounding the magnet coil (5), at least in some section or sections.

* * * * *